United States Patent
Driscoll et al.

(10) Patent No.: US 9,792,426 B1
(45) Date of Patent: Oct. 17, 2017

(54) SYSTEM AND METHOD FOR PROVIDING ANONYMOUS ACCESS TO SHARED RESOURCES

(71) Applicant: Dell Software Inc., Aliso Viejo, CA (US)

(72) Inventors: Adam Robert Driscoll, Madison, WI (US); Marc Edward Zapf, Stone Ridge, VA (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 14/169,103

(22) Filed: Jan. 30, 2014

(51) Int. Cl.
*G06F 21/41* (2013.01)
*G06F 21/62* (2013.01)

(52) U.S. Cl.
CPC .............. *G06F 21/41* (2013.01); *G06F 21/62* (2013.01)

(58) Field of Classification Search
None
See application file for complete search history.

(56) References Cited

U.S. PATENT DOCUMENTS

| | | | |
|---|---|---|---|
| 7,171,202 B2 * | 1/2007 | Chen .................. H04L 63/0807 455/410 |
| 8,255,984 B1 | 8/2012 | Ghostine et al. |
| 8,499,158 B2 | 7/2013 | Lee et al. |
| 8,544,072 B1 * | 9/2013 | Masone et al. ................... 726/6 |
| 8,560,593 B2 | 10/2013 | Ghostine |
| 8,849,978 B1 * | 9/2014 | Batson et al. ................. 709/223 |
| 2006/0230438 A1 * | 10/2006 | Shappir ................. G06F 21/335 726/8 |
| 2007/0244896 A1 | 10/2007 | Liu et al. |
| 2008/0034028 A1 * | 2/2008 | Ferrell et al. ................. 709/201 |
| 2009/0307623 A1 * | 12/2009 | Agarawala et al. .......... 715/765 |
| 2011/0202916 A1 * | 8/2011 | VoBa et al. ....................... 718/1 |
| 2012/0226742 A1 * | 9/2012 | Momchilov et al. .......... 709/203 |
| 2012/0264402 A1 * | 10/2012 | Zhang ................. H04L 63/0815 455/411 |
| 2012/0324365 A1 * | 12/2012 | Momchilov et al. .......... 715/738 |
| 2013/0031000 A1 * | 1/2013 | Morris ........................... 705/44 |

OTHER PUBLICATIONS

About Citrix VDI-in-a-Box 5.0x—Citrix eDocs, 2012, pp. 1-37.*
Oracle Corporation, "Sun OpenSSO Enterprise 8.0 Administration Reference," 2010, 2 pages.

* cited by examiner

*Primary Examiner* — Benjamin Lanier
(74) *Attorney, Agent, or Firm* — Winstead PC

(57) ABSTRACT

In one embodiment, a method is performed on a shared-resources system. The method includes creating an anonymous target. The method further includes assigning shared resources to the anonymous target. In addition, the method includes receiving a request for anonymous access from an anonymous user of a client system. The method also includes, responsive to the request, performing the following: generating anonymous-user credentials for the anonymous user; determining the shared resources assigned to the anonymous target; based, at least in part, on the determining, communicating a list of authorized resources to the client system; receiving a request from the client system to access a target resource from the list of authorized resources; and causing an anonymous-user account to be created on the target resource using the anonymous-user credentials.

20 Claims, 8 Drawing Sheets

SYSTEM AND METHOD FOR PROVIDING ANONYMOUS ACCESS TO SHARED RESOURCES

BACKGROUND

Technical Field

The present invention relates generally to information security and more particularly, but not by way of limitation, to systems and methods for anonymous access to shared resources.

History of Related Art

Many companies take advantage of virtualization solutions to consolidate several specialized physical servers and workstations into fewer servers running virtual machines. Each virtual machine can be configured with its own set of virtual hardware (e.g., processor, memory, ports, and the like) such that specialized services that each of the previous physical machines performed can be run in their native operating system. In particular, a virtualization layer, or hypervisor, allocates the computing resources of one or more host servers into one or more virtual machines and further provides for isolation between such virtual machines. In such a manner, the virtual machine is a representation of a physical machine by software.

Virtualization solutions can be adapted to provide virtual desktop computing (VDC). In VDC systems, each virtual machine can represent a virtual desktop, which can be accessed remotely by a client machine. By providing virtual desktops, VDC systems can allow users to access their applications and data from any remote computing device. VDC systems also centralize and streamline desktop administration for IT administrators.

Terminal Services is a MICROSOFT WINDOWS component that provides benefits similar to the benefits of VDC systems. A machine running Terminal Services is a Terminal Server, which can act like a mainframe multi-user operating system. As such, the Terminal Server can allow multiple concurrent users to start a remote interactive Windows session Like VDC systems, Terminal Servers centralize user application and data, allowing remote access and efficient IT administration.

Authentication to a virtual desktop or Terminal Server can be performed using single sign-on authentication. Single sign-on authentication is a technique that can reduce or eliminate credentials re-prompting each time a user accesses a computing resource, such as a virtual desktop, Terminal Server session, or application. Single sign-on authentication generally requires that a client initially provide a set of credentials for validation. To provide single-sign-on authentication without obtaining credentials from the client can be advantageous but also poses security risks. For example, typical solutions can result in user data of one anonymous user being inadvertently exposed to other anonymous users.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed on a shared-resources system. The method includes creating an anonymous target. The method further includes assigning shared resources to the anonymous target. In addition, the method includes receiving a request for anonymous access from an anonymous user of a client system. The method also includes, responsive to the request, performing the following: generating anonymous-user credentials for the anonymous user; determining the shared resources assigned to the anonymous target; based, at least in part, on the determining, communicating a list of authorized resources to the client system; receiving a request from the client system to access a target resource from the list of authorized resources; and causing an anonymous-user account to be created on the target resource using the anonymous-user credentials.

In one embodiment, an information handling system includes a processing unit, wherein the processing unit is operable to implement a method. The method includes creating an anonymous target. The method further includes assigning shared resources to the anonymous target. In addition, the method includes receiving a request for anonymous access from an anonymous user of a client system. The method also includes, responsive to the request, performing the following: generating anonymous-user credentials for the anonymous user; determining the shared resources assigned to the anonymous target; based, at least in part, on the determining, communicating a list of authorized resources to the client system; receiving a request from the client system to access a target resource from the list of authorized resources; and causing an anonymous-user account to be created on the target resource using the anonymous-user credentials.

In one embodiment, a computer-program product includes a non-transitory computer-usable medium having computer-readable program code embodied therein. The computer-readable program code is adapted to be executed to implement a method. The method includes creating an anonymous target. The method further includes assigning shared resources to the anonymous target. In addition, the method includes receiving a request for anonymous access from an anonymous user of a client system. The method also includes, responsive to the request, performing the following: generating anonymous-user credentials for the anonymous user; determining the shared resources assigned to the anonymous target; based, at least in part, on the determining, communicating a list of authorized resources to the client system; receiving a request from the client system to access a target resource from the list of authorized resources; and causing an anonymous-user account to be created on the target resource using the anonymous-user credentials.

BRIEF DESCRIPTION OF THE DRAWINGS

A more complete understanding of the method and apparatus of the present invention may be obtained by reference

BRIEF DESCRIPTION OF THE DRAWINGS

Figure 1:
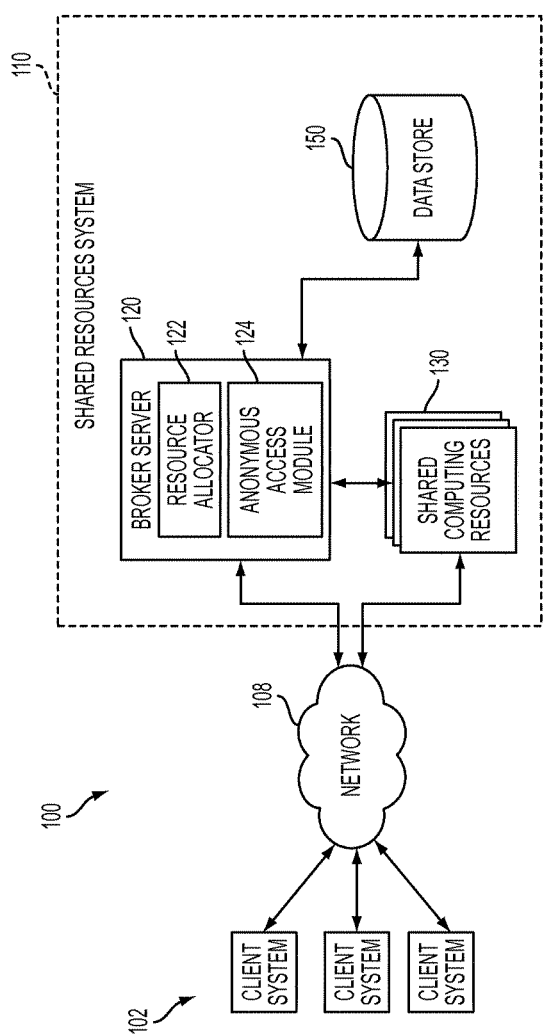
Figure 2:
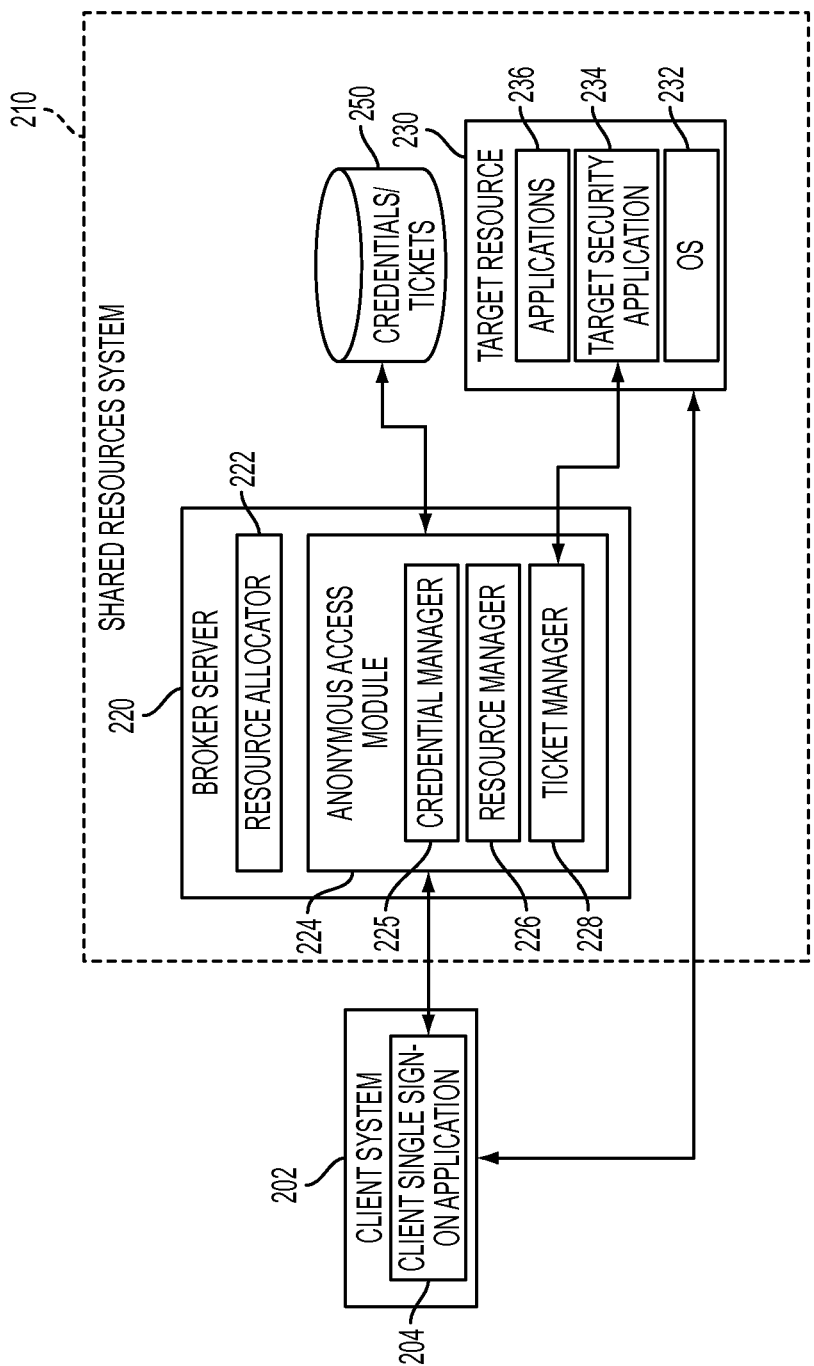
Figure 3:
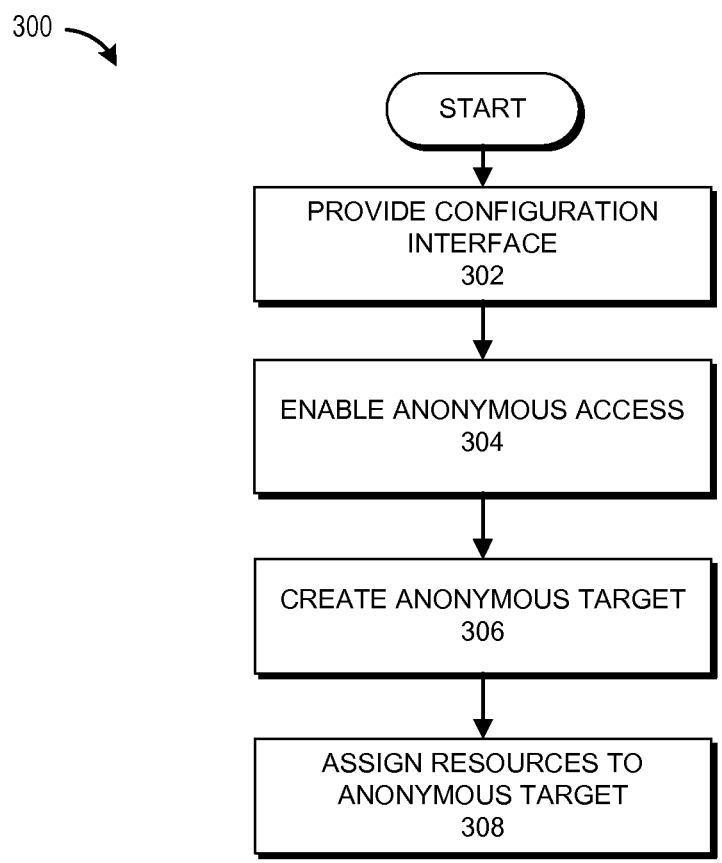
Figure 4:
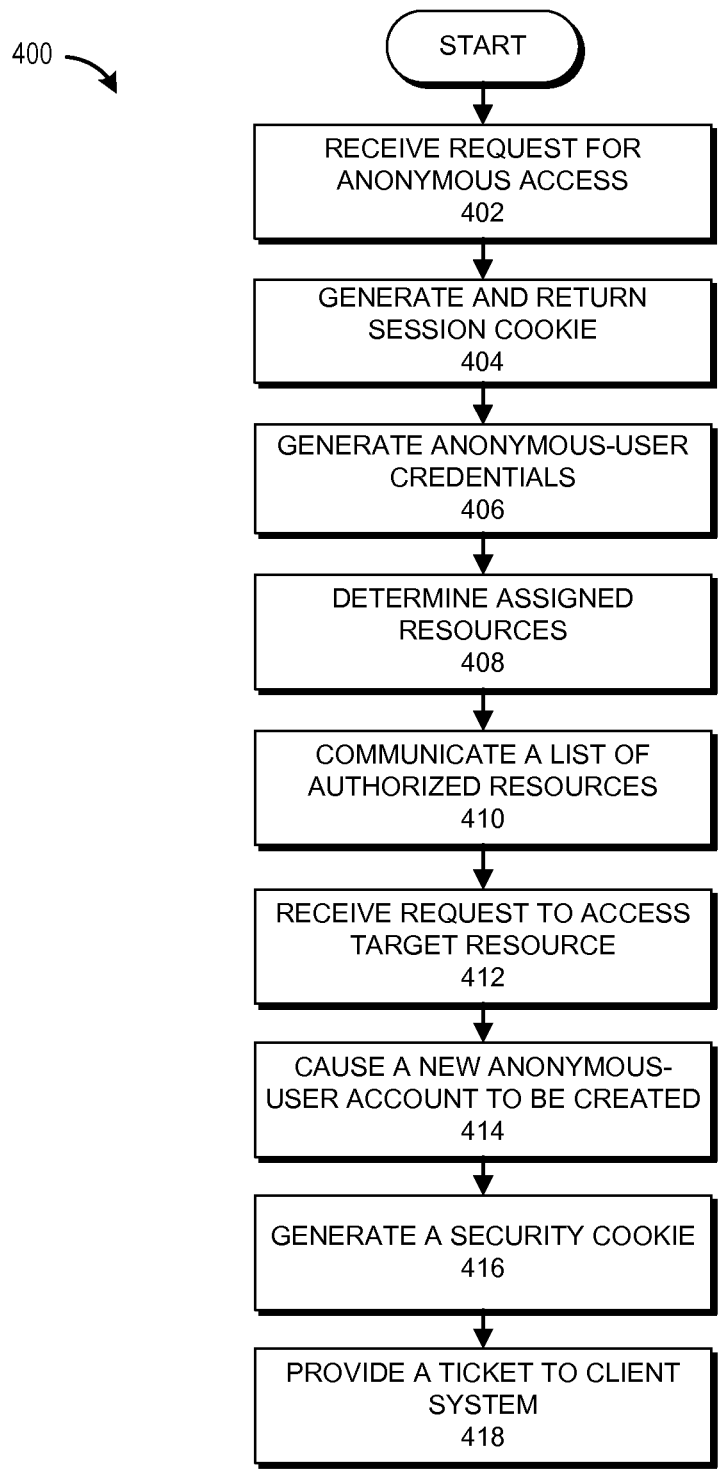
Figure 5A:
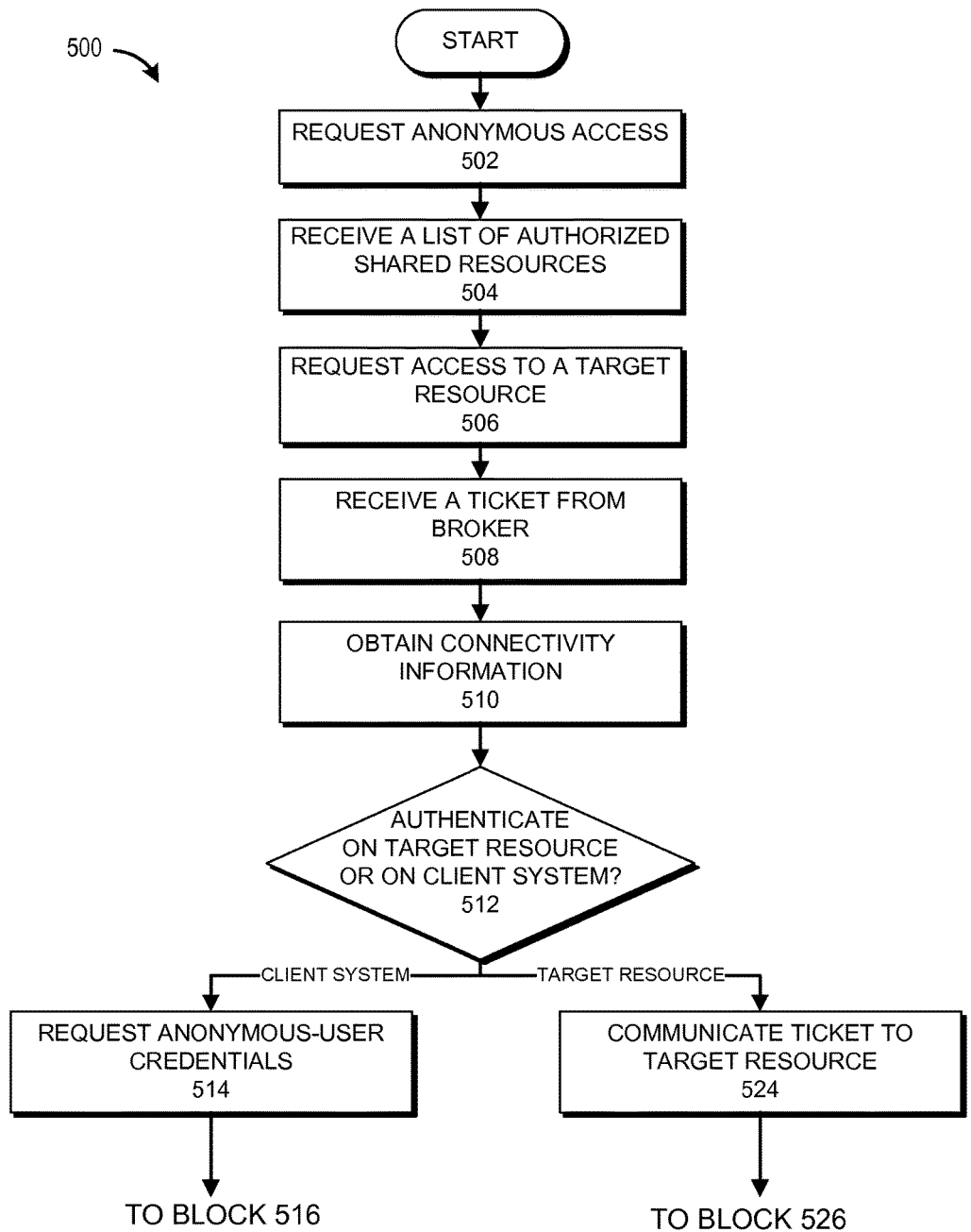
Figure 5B:
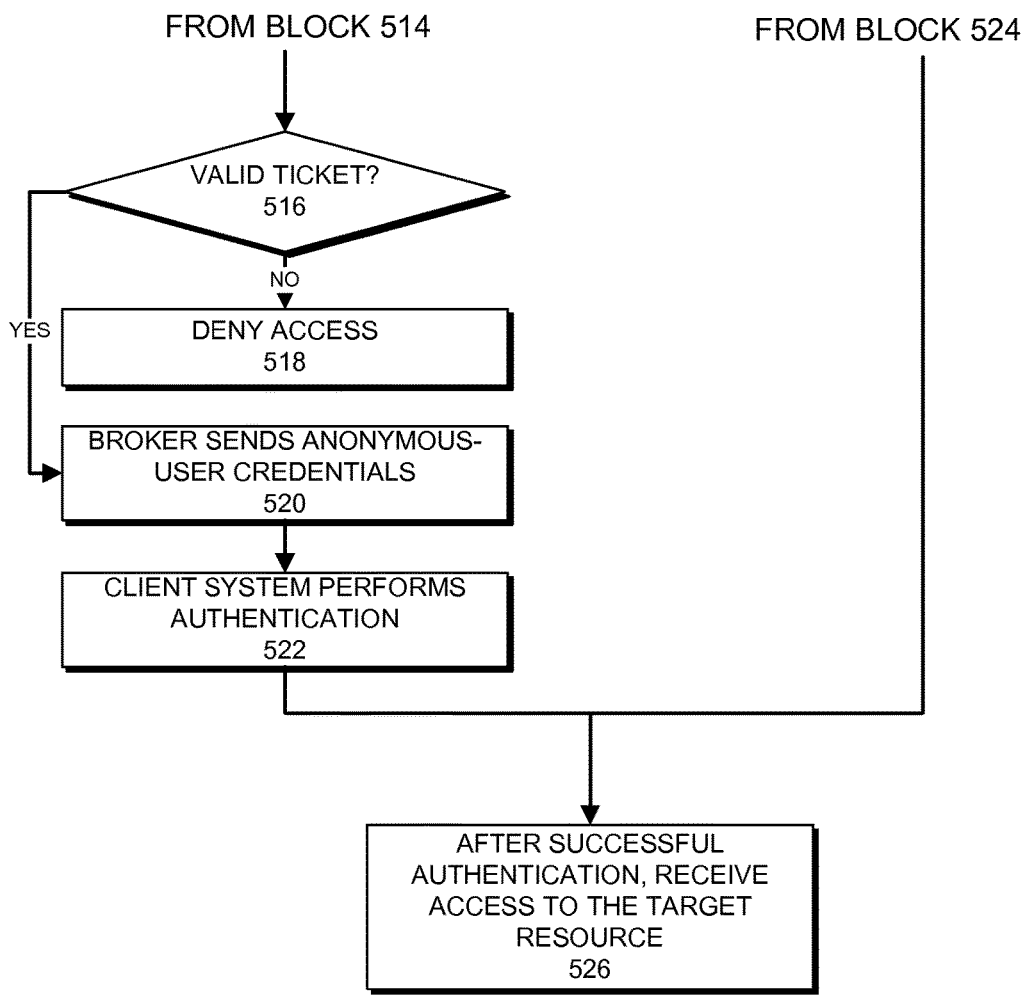
Figure 6A:
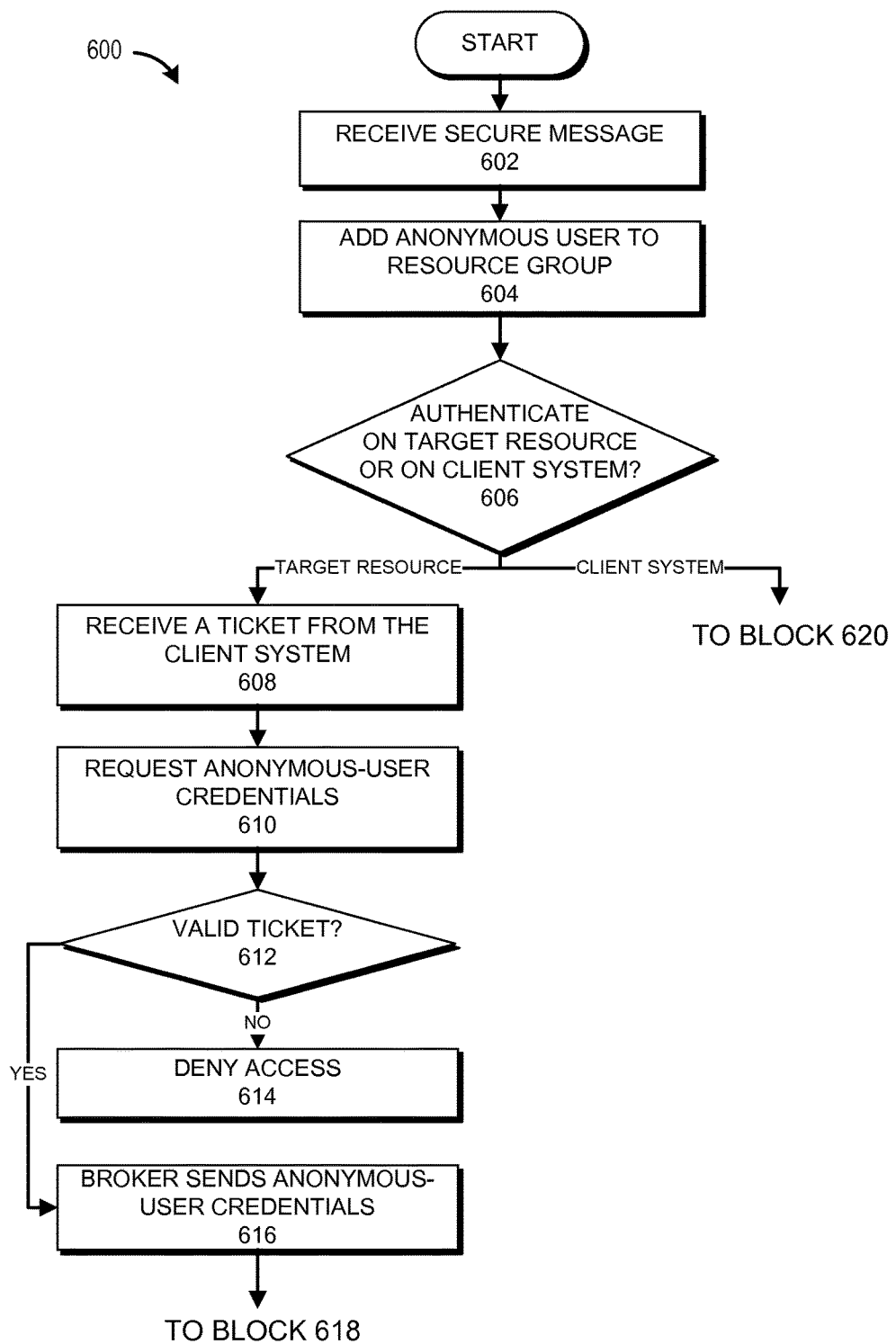
Figure 6B:
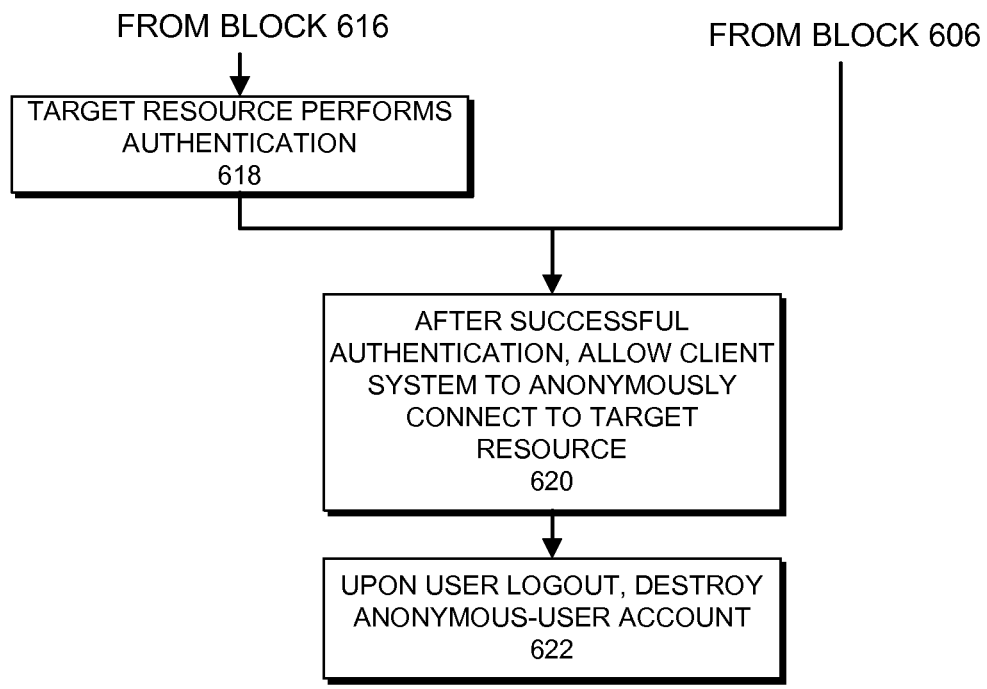

FIG. 1 illustrates an embodiment of a network environment;

FIG. 2 illustrates a shared resources system;

FIG. 3 illustrates an example of a process for configuring anonymous-access settings;

FIG. 4 illustrates an anonymous-authentication process from the perspective of a broker server;

FIGS. 5A-5B illustrate an anonymous-authentication process primarily from the perspective of a client system; and FIGS. 6A-6B illustrates an anonymous-authentication process primarily from the perspective of a target resource.

DETAILED DESCRIPTION OF ILLUSTRATIVE EMBODIMENTS OF THE INVENTION

In a server-based computing environment, shared resources such as virtual desktops and/or Terminal Servers can be pooled in a centralized data center. Client devices can initiate network connections with the shared resources using a remote protocol, allowing these clients to establish interactive computing sessions.

A network service, referred to as a broker, can be responsible for authenticating a client and providing it with an authorized list of named resources based at least partly on the client's identity and other network and security attributes. These named resources represent shared resources that the client is eligible to access. Upon requesting connectivity to a particular named resource, the broker can also be responsible for resolving the named resource to an actual network address that the client can use to establish a connection.

In various embodiments, it can be advantageous to allow clients to access shared resources without the clients providing any credentials (i.e., anonymously). For example, some shared resources such as virtual desktops may publish applications that perform their own authentication. In addition, some administrators may not want to maintain directory services such as, for example, MICROSOFT Active Directory.

With respect to virtual desktops, one way to implement anonymous access is for the broker to maintain a pool of accounts for the virtual desktops. In response to requests for anonymous access, the broker can check out accounts from the pool to clients. A downside of this approach is that each anonymous user may change or infect some aspect of the virtual desktop. For example, one anonymous user may change a user profile in a way that also affects subsequent anonymous users who are checked out the same account. Another downside is that, despite security measures, there remains a risk that one anonymous user may log in and be given access to a previous anonymous user's data.

This disclosure describes systems and methods for permitting clients to anonymously access shared resources. Stated somewhat differently, the broker can allow clients to access the shared resources without receiving or validating any credentials from the clients. When an anonymous option is enabled on the broker and a request for anonymous access is received, the broker can provide a list of named resources that are authorized for anonymous access. In certain embodiments, the broker dynamically creates an anonymous-user account on a shared resource for each anonymous-user session. In addition, for a given anonymous-user session, the dynamically-created user account can be destroyed when the anonymous-user session ends.

Advantageously, in certain embodiments, the systems and methods described herein allow each anonymous user to be given a clean environment when accessing the shared resources. For example, with respect to virtual desktops, each anonymous user can be provided a new virtual desktop environment that has not been used previously by another user or anonymous user. As additional advantages, because anonymous user accounts are created at a start of an anonymous user session and are destroyed at an end of an anonymous user session, a risk that one anonymous user will log in and be given access to a previous anonymous user's data can be eliminated.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates an embodiment of a network environment 100 for providing anonymous access to a shared resources system 110. The shared resources system 110 can provide anonymous access for users of client systems 102 to shared computing resources 130. These shared resources 130 can include virtual desktops, Terminal Servers, blade computers (such as blade PCs), applications, and the like. Advantageously, in certain embodiments, the shared resources system 110 also provides anonymous single sign-on (SSO) access to these resources 130.

The shared resources system 110 can be implemented by one or more information handling systems, such as servers. These information handling systems can be distributed geographically or can be co-located. The client systems 102 can include, for example, desktop computers, workstations, personal digital assistants (PDAs), mobile phones, other wireless handheld devices, laptop computers, tablets, and the like.

The client systems 102 can further include various software applications for anonymously accessing the shared resources system 110, such as browser software applications, stand-alone software applications, plug-ins, interfaces, combinations of the same, and the like. The client systems 102 can access the shared resources system 110 over a network 108, which can include a local or wide area network (LAN or WAN), such as an organization's intranet, the Internet, combinations of the same, and the like.

In the depicted embodiment, the shared resources system 110 includes a broker server 120, the shared resources 130 described above, and a data store 150. Each of these components can be implemented in software and/or hardware. For example, in one embodiment, the broker server 120 represents an information handling system that is a physical computing device. In another embodiment, the broker server 120 represents a software service executing on an information handling system. Although the various components of the shared resources system 110 are illustrated separately, some or all of them can be implemented together in one or more of the same computing devices.

The broker server 120 can allow the client systems 102 to communicate with the broker server 120 to obtain anonymous access to the shared resources 130. The example broker server 120 shown includes a resource allocator 122 and an anonymous-access module 124. The resource allocator 122 can perform load balancing in certain embodiments by allocating shared resources 130 to client systems 102 in a manner that reduces the load on any given resource 130. The anonymous-access module 124 can provide anonymous SSO access for the client systems 102 to the shared resources 130. The features of the anonymous-access module 124 are described in greater detail below.

In certain embodiments, the broker server 120 can also implement certain features of the broker described in U.S. Pat. No. 8,560,593 (the "'593 patent"), the disclosure of which is hereby incorporated by reference in its entirety. In certain embodiments, the broker server 120 can further implement certain features of the broker described in U.S. Pat. No. 8,255,984 (the "'984 patent"), the disclosure of which is also hereby incorporated by reference in its entirety.

As described above, the shared resources 130 can include virtual desktops, Terminal Servers, and blade computers (such as blade PCs), applications, combinations of the same, and the like. The shared resources 130 can be implemented using any of the features described in the '594 patent or the '984 patent referred to above. Further, in embodiments where the shared resources 130 include virtual desktops, the shared resources 130 can include virtual machines implemented on a hypervisor. The hypervisor can allow multiple virtual desktops having possibly different operating systems to run on a host computer at the same time.

For instance, the hypervisor can include a thin piece of software that runs directly on top of a hardware platform of a host computer and that virtualizes resources of the computer (e.g., a native or "bare-metal" hypervisor). In such embodiments, the virtual desktops can run, with their respective operating systems, on the hypervisor without the need for a host operating system. Examples of such bare-metal hypervisors can include, but are not limited to, ESX SERVER by VMware, Inc. (Palo Alto, Calif.), XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), VIRTUOZZO by Parallels, Inc. (Switzerland), and the like.

In yet other embodiments, the virtual desktops can have a hosted architecture in which the hypervisor runs within a host operating system environment. In such embodiments, the hypervisor can rely on the host operating system for device support and/or physical resource management. Examples of such hosted hypervisors can include, but are not limited to, VMWARE WORKSTATION and VMWARE SERVER by VMware, Inc., VIRTUAL SERVER by Microsoft Corporation, PARALLELS WORKSTATION by Parallels, Inc., or the like.

In certain embodiments, each virtual desktop includes a guest operating system and associated applications. In such embodiments, the virtual desktop accesses the resources (e.g., privileged resources) of the host computer through the hypervisor. Many other variations in virtualization technology are possible.

As described above, the anonymous-access module 124 of the broker server 120 can provide anonymous users with SSO access to the shared resources 130. The anonymous-access module 124 can be used by an administrator or other authorized user to configure anonymous-access settings. For example, the administrator can enable anonymous access to the shared resources and establish a list of those of the shared resources 130 that anonymous users can access. The anonymous-access settings can be stored, for example, in the data store 150 or in memory. An example of configuring the anonymous-access settings will be described with respect to FIG. 3.

In one embodiment, the anonymous-access module 124 receives initial client system 102 requests to anonymously access the broker server 120. For example, in certain embodiments, an anonymous option can be specified in the request (e.g., in XML). Many remote protocols such as remote desktop protocol (RDP) require that authentication occur in order to connect to any of the shared resources 130. Therefore, in response to the request, the anonymous-access module 124 can dynamically generate anonymous-user credentials for the anonymous user. The anonymous-user credentials can include a user name and password. In various embodiments, the anonymous-user credentials can be randomly generated. Thereafter, the anonymous-user credentials can be used to dynamically create an anonymous-user account on one or more the shared resources 130. Operability of the anonymous-access module 124 to dynamically create anonymous-user accounts and provide anonymous access to the shared resources 130 will be described in greater detail with respect to FIG. 4.

One mechanism that the anonymous-access module 124 can use to provide client systems 102 with anonymous access to a shared resources 130 is to provide tickets to the client systems 102. A ticket can include any piece of data, such as metadata. A client system 102 in possession of a valid ticket received from the anonymous-access module 124 can be given anonymous access to a shared resource 130. In general, the anonymous-access module 124 is operable, when presented with a valid ticket, to provide a corresponding set of anonymous-user credentials. In various embodiments, authentication of the anonymous-user credentials can occur on the shared resource 130 or on the client system 102. Examples of authentication of anonymous-user credentials will be described in greater detail with respect to FIGS. 4-6. The anonymous-access module 124 can store the anonymous-user credentials and tickets in the data store 150 or in memory.

In some embodiments, the ticket provided by the anonymous-access module 124 is a single-use ticket. The client system 102 can use this single-use ticket to connect to a single shared resource 130. A benefit of single-use tickets, in certain embodiments, is that subsequent use of the ticket by a malicious user can result in denial of access to the shared resource 130. In some embodiments, the anonymous-access module 124 can also establish an expiration period or time to live (TTL) for the ticket, such as 30 seconds, 60 seconds, several minutes, or some other time. If a client system 102 does not attempt to connect or does not actually connect with a shared resource 130 before the ticket expires, the client system 102 can be denied access to the shared resource 130. Further, the ticket can be encrypted with a single or multi-level encryption algorithm.

FIG. 2 illustrates a more detailed embodiment of the shared resources system 110, namely the shared resources system 210. The shared resources system 210 can include all the features of the shared resources system 110 described above. For instance, the shared resources system 210 includes a broker server 220, target shared resource 230, and a data store 250. These components can include all the functionality described above. Additionally, a client system 202 is shown connecting with the shared resources system 210. The client system 202 can have all the functionality described above with respect to the client system 102. For ease of illustration, the network 108 is not depicted in the embodiment shown. However, it should be understood that the client system 202 can communicate with the shared resources system 210 over a network such as the network 108.

In the depicted embodiment, the client system 202 includes a client SSO application 204. This application 204 can be implemented in the hardware of the client system 202. In one embodiment, the client SSO application 204 receives a request for anonymous access from a login user interface provided by the application 204 or by an operating system of the client system 202. The request can be made, for example, via a user interface provided to the anonymous user by the client SSO application 204. The request can also be made, for example, through an operating system prompt.

The broker server 220, like the broker server 120, includes a resource allocator 222 and an anonymous-access module 224. In the depicted embodiment, the anonymous-access module 224 is shown having three modules: a credential manager 225, a resource manager 226, and a ticket manager 228. In certain embodiments, the credential manager 225 generates anonymous-user credentials in response to anonymous access requests. The credential manager 225 can store the anonymous-user credentials in a security cookie or the like. In addition to having its ordinary meaning, as used herein the term "security cookie" can represent contextual information that is maintained by a server. The contextual information maintained by the broker server 220 in the security cookie can include the anonymous-user credentials, among other things. In one embodiment, the credential manager 225 stores the security cookie in the data store 250 or in a memory.

The resource manager 226 can select one or more shared resources that are available for anonymous access by the client system 202. The resource manager 226 can obtain information regarding which resources are available from the resource allocator 222. For example, the resource allocator 222 can apply a load balancing algorithm to determine which shared resources are available and can provide this availability information to the resource manager 226. The resource manager 226 can communicate to the client system 202 a list of one or more authorized resources that the client system 202 is permitted to anonymously access. What constitutes authorized resources can be determined, for example, via configuration of anonymous-access settings as will be described in greater detail with respect to FIG. 3.

In response to receiving such a list of one or more authorized resources, the client SSO application 204 can select a target resource (e.g., the target resource 230) to which the client system 202 would like to anonymously connect. The application 204 can communicate this request to the anonymous-access module 224. The resource manager 226 of the anonymous-access module 224 can receive this request. As will be described in greater detail with respect to FIG. 4, the resource manager 226 can cause a new anonymous-user account to be created on the target resource 230.

The ticket manager 228 can create a ticket having a reference to the security cookie previously generated by the credential manager 225 in response to receiving the request. The ticket manager 228 can also store the ticket in the data store 250 or in a memory. The ticket manager 228 can provide the ticket to the application 204 of the client system 202. This ticket can enable the application 204 of the client system 202 to authenticate to the target resource 230.

The target resource 230 includes, in the depicted embodiment, an operating system 232 (such as a guest operating system), a target security application 234, and other applications 236. The target resource 230 can receive a ticket from the client SSO application 204 for purposes of anonymously accessing the target resource 230. In embodiments where the target resource 230 performs authentication of anonymous-user credentials, the target security application 234 can provide the ticket to the ticket manager 228 of the broker server 220. In response, the ticket manager 228 can provide the anonymous-user credentials stored in the data store 250 to the target security application 234. In embodiments where the client system 102 performs authentication of anonymous-user credentials, the client SSO application 204 can instead provide the ticket to the ticket manager 228 of the broker server 220. Thereafter, the ticket manager 228 can provide the anonymous user credentials stored in the data store 250 to the client SSO application 204.

Once authenticated, the client system 202 can access the applications 236 of the target resource 230. In certain embodiments, as described above, the applications 236 may individually authenticate the anonymous user in a non-anonymous fashion as access to those applications is attempted. To enhance security, in certain embodiments the ticket manager 228 can destroy the ticket so that a subsequent access to the target resource 230 with the ticket does not successfully authenticate. The ticket manager 228 can destroy the ticket, for example, by deleting the ticket from the data store 250.

In various embodiments, security can be further enhanced by the target resource 230 destroying the anonymous-user account when the anonymous user logs out from the shared resource. For example, in embodiments in which the target resource 230 is a virtual desktop, the target resource 230 (or an agent resident thereon) can remove the anonymous-user account from a remote desktop group and a delete a user profile associated with the anonymous-user account.

FIG. 3 presents a flowchart of an example of a process 300 for configuring anonymous-access settings. For example, the process 300, in whole or in part, can be implemented by one or more of the shared resources system 110, the shared resources system 210, and the broker server 120. Although any number of systems, in whole or in part, can implement the process 300, to simplify discussion, the process 300 will be described in relation to specific systems or subsystems of a shared resources system such as the shared resources system 110 or 210. For example, all or part of the process 300 can be facilitated via an anonymous-access module such as the anonymous-access module 124 or 224.

At block 302, an administrator or other authorized user accesses a configuration interface provided by the anonymous-access module. In various embodiments, the configuration interface can be a command-line interface and/or a graphical user interface. At block 304, anonymous access to the shared resources system is enabled in response to a selection by the administrator. For example, in various embodiments, anonymous access can be enabled by setting a flag to true. In one embodiment, the flag can be stored in a structure within a data store such as the data store 150 or 250.

At block 306, the anonymous-access module creates an anonymous target. The anonymous target can be a structure that generically represents anonymous users of the shared resources system. At block 308, in response to input from the administrator, the anonymous-access module assigns shared resources to the anonymous target. The shared resources can be similar, for example, to the shared resources 130 or 230. For example, in some embodiments, the anonymous-access module can assign virtual desktops and related resources to the anonymous target. The related resources can include, for example, applications (e.g., the applications 236), mapped drives, mapped printers, user-profile settings, environment variables, application shortcuts, connection policies, desktop background bitmap, login settings, host restrictions (e.g., blocking of websites), and/or the like. In general, the shared resources that are assigned represent those shared resources that anonymous users will be authorized to access. At block 310, the resource assignments can be stored in the data store 150 or 250 or in a memory.

Turning to FIGS. 4 through 6, various embodiments of authentication processes are illustrated. In particular, FIG. 4 illustrates an anonymous-authentication process 400 from the perspective of a broker server, FIGS. 5A-5B illustrate an anonymous-authentication process 500 primarily from the perspective of a client system, and FIGS. 6A-6B illustrates an anonymous-authentication process 600 primarily from the perspective of a target resource.

Referring specifically to FIG. 4, an embodiment of a broker authentication process 400 is illustrated for providing anonymous SSO access to shared resources. The broker authentication process 400 can be implemented by the shared resources system 110 or 210. For example, the broker authentication process 400 can be implemented by the anonymous-access module 124 or 224.

At block 402, a request for anonymous access is received from a client system of an anonymous user. For example, in certain embodiments, an anonymous option can be specified in the request (e.g., in XML). At block 404, a session cookie is generated and returned to the client system. The session cookie can be used by the client system when making subsequent anonymous requests. In some embodiments, the session cookie can include a randomly generated identifier that is mapped to the request. In these embodiments, the randomly generated identifier can facilitate reconnection to disconnected sessions. In some embodiments, the block 404 can be omitted.

At block 406, a credential manager such as the credential manager 225 can generate anonymous-user credentials for the anonymous user. The anonymous-user credentials can include, for example, a user name and a password. For example, in one embodiment, the user name can be of the format "Anonymous-XXXXXXXXXX," where each 'X' represents a randomly generated number. In certain embodiments, the password can be a randomly generated string of characters, numbers, and symbols such that the password conforms to password policies of shared resources such as the shared resources 130 or 230.

At block 408, a resource manager such as the resource manager 226 determines what shared resources have been assigned to an anonymous target. In various embodiments, the shared resources may have been assigned as described with respect to the process 300 of FIG. 3. In certain embodiments, the resource assignments can be determined by querying a data store such as the data store 150 or 250.

At block 410, a list of authorized resources is communicated to the client system. This list can be communicated to the client system by the resource manager. The list can include, for example, the resource assignments determined at block 408. At block 412, a request is received from the client system to access a target one of the authorized resources.

At block 414, the resource manager 226 can cause a new anonymous-user account, as defined by the anonymous-user credentials, to be created on the target resource 230. For example, in certain embodiments, a secure message is sent to the target resource to add the anonymous user to a resource group for that target resource. In embodiments in which the target resource is a virtual desktop, the anonymous user can be added to a remote desktop group for that virtual desktop. In various embodiments, the secure message can be encrypted.

At block 416, a security cookie is generated. The security cookie can store the anonymous-user credentials. At block 418, a ticket is provided to the client system. The ticket identifies the security cookie to the client system. For example, in one embodiment, the security cookie is assigned a global unique identifier by a broker server such as the broker server 120 or 220. The ticket can include this global unique identifier as a reference to identify the security cookie. This identification information can enable the client system to authenticate to the target resource.

FIGS. 5A-5B illustrate an embodiment of a client/broker authentication process 500 for providing anonymous SSO access to shared resources. The client authentication process 500 can be implemented by the shared resources system 110 or 210. In particular, the client authentication process 500 can be accomplished by the client SSO application 204.

At block 502, anonymous access to a shared resource is requested from a broker server. The access request may or may not specify a particular shared resource. A list of authorized shared resources is received from the broker server at block 504. At block 506, access is further requested to a specific target one of the authorized shared resources. The client system can select this target from the list of named resources. A ticket is received from the broker at block 508. The ticket contains an authentication file identifier. This identifier can refer to a security cookie generated by the broker server (see FIG. 4).

A launch file is used to initiate a connection with the broker server at block 510 to obtain connectivity information for the target resource. The client system can create the launch file by storing the ticket in computer storage. The connection initiated with the broker server can be a secure connection in certain embodiments.

At decision block 512, it is determined whether authentication of anonymous-user credentials will occur on the target resource (e.g., on a virtual desktop) or on the client system using an SSO application such as the client SSO application 204. In some embodiments, if the client system supports a particular protocol such as, for example, CredSSP, the authentication can occur in the client SSO application (e.g., within a RDP control).

If it is determined at decision block 512 that authentication of anonymous-user credentials will occur on the client system, the process 500 proceeds to block 514. At block 514, the client SSO application can request the anonymous-user credentials from the broker server using the ticket. It is determined at block 516 whether the ticket is valid. In one embodiment, the broker server can determine validity of the ticket by checking for a corresponding ticket in the data store 150 or 250. In one embodiment, the client SSO application itself can perform this checking. Determining whether the ticket is valid can include determining whether the ticket is expired. A ticket can expire in certain embodiments due to a time limit being exceeded or due to the ticket being used previously to authenticate to a target resource.

If the ticket is not valid, the broker and/or target resource can deny access to the target resource at block 518. The client system therefore cannot access the target resource at block 518. Otherwise, the broker server sends anonymous-user credentials to the client SSO application at block 520. The client SSO application uses the anonymous-user credentials to perform the authentication at block 522.

If it is determined at the decision block 512 that the authentication will occur on the target resource (e.g., because the client system does not support a particular protocol such as CredSSP), the process 500 proceeds to block 524. At block 524, the ticket is communicated to the target resource so that the authentication can occur on the target resource. At block 526, after successful authentication of the anonymous-user credentials (whether on the client system or the target resource), the client system can receive anonymous access to the target resource.

FIGS. 6A-6B illustrates an embodiment of a target resource/broker authentication process 600 for providing anonymous SSO access to shared resources. The authentication process 600 can be implemented by the shared resources system 110 or 210. In particular, the authentication process 600 can be accomplished by the target security application 234 and the ticket manager 228.

At block 602, a target resource receives, from a broker server such as the broker server 120 or 220, a secure message with instructions to add an anonymous user to a resource group of the target resource (see block 414 of FIG. 4). For example, if the target resource is a virtual desktop, the instructions could be to add the user to a remote desktop group of that virtual desktop. The target resource adds the user to the resource group at block 604.

At decision block 606, it is determined whether authentication of anonymous-user credentials will occur on the target resource (e.g., on a virtual desktop) or on the client system using an SSO application such as the client SSO application 204. In some embodiments, if the client system supports a particular protocol such as, for example, CredSSP, the authentication can occur in the SSO application.

If it is determined at decision block 606 that authentication of anonymous-user credentials will occur on the client system, the process 600 proceeds to block 620 (described below). If it is determined at the decision block 606 that the authentication will occur on the target resource (e.g., because the client system does not support a particular protocol such as CredSSP), the process 600 proceeds to block 608. At block 608, the target resource receives a ticket (including, e.g., an authentication file identifier) from the client system. In response, at block 610, the target resource sends the ticket to the broker server and requests anonymous-user credentials stored in the security cookie (see FIG. 4). It is determined at block 612 whether the ticket is valid. In one embodiment, the broker server can determine validity of the ticket by checking for a corresponding ticket in the data store 150 or 250. In one embodiment, the target resource itself can perform this checking. Determining whether the ticket is valid can include determining whether the ticket is expired. A ticket can expire in certain embodiments due to a time limit being exceeded or due to the ticket being used previously to authenticate to a target resource.

If the ticket is not valid, the broker and/or target resource can deny access to the target resource at block 614. The client system therefore cannot access the target resource at block 614. Otherwise, the broker server sends anonymous-user credentials to the target resource at block 616. The target resource uses the anonymous-user credentials to authenticate the client system at block 618. At block 620, after successful authentication of the anonymous-user credentials (whether on the client system or the target resource), the target resource allows the client system to anonymously connect thereto.

At block 622, upon user logout, the target resource (or an agent resident thereon) can destroy an anonymous-user account corresponding to the anonymous user. For example, the anonymous-user account can be removed from the a resource group (e.g., remote desktop group) for the target resource. Advantageously, in certain embodiments, removal of the user from the resource group prevents the client system from reconnecting to the target resource without going through the broker server. In addition, a user profile and any user data stored within the anonymous user's session can be deleted. However, in a typical embodiment, other user data persistently stored outside the anonymous user's session is retained.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, on a broker server comprising a computer processor and memory, wherein the broker server provides single sign-on (SSO) access to shared resources:
   creating an anonymous target that generically represents anonymous users;
   assigning at least a portion of the shared resources to the anonymous target;
   receiving a request for anonymous access from a client system of an anonymous user, wherein the request for anonymous access excludes credentials;
   responsive to the request for anonymous access:
     generating, by the broker server, single-session anonymous-user credentials for the anonymous user, wherein the single-session anonymous-user credentials are not presented to or provided by the anonymous user;
     determining the shared resources assigned to the anonymous target;
     communicating at least a portion of the determined shared resources to the client system as authorized anonymous-access resources;
     responsive to the communicating, receiving a request from the client system to access a target resource of the authorized anonymous-access resources;
     responsive to the request to access the target resource, causing an anonymous-user account to be created on the target resource using the single-session anonymous-user credentials; and
     allowing the client system anonymous SSO access to the target resource via the anonymous-user account and without the client system providing credentials to the broker server.

2. The method of claim 1, wherein the assigning comprises assigning virtual desktops and related resources to the anonymous target.

3. The method of claim 2, wherein the related resources are selected from the group consisting of: applications, mapped drives, mapped printers, user-profile settings, environment variables, application shortcuts, connection policies, desktop background bitmap, login settings, and host restrictions.

4. The method of claim 2, wherein:
the related resources comprise at least one application; and
the at least one application authenticates the anonymous user in a non-anonymous fashion as the anonymous user accesses the at least one application.

5. The method of claim 1, wherein the generating of the single-session anonymous-user credentials comprises randomly generating a user name and a password.

6. The method of claim 1, comprising, prior to the generating, returning a session cookie to the client system, the session cookie comprising a random identifier mapped to the request for anonymous access.

7. The method of claim 1, wherein the determining comprises querying a data store for the shared resources assigned to the anonymous target.

8. The method of claim 1, wherein the causing comprises sending a message to the target resource, the message comprising an instruction to add the anonymous-user account to a resource group for the target resource.

9. The method of claim 1, comprising, upon logout by the anonymous user from the target resource, destroying the anonymous-user account.

10. The method of claim 9, wherein the destroying comprises:
removing the anonymous-user account from a resource group for the target resource;
deleting a user profile associated with the anonymous-user account; and
deleting any user data created within the anonymous user's session.

11. The method of claim 1, comprising enabling anonymous access on the broker server.

12. The method of claim 1, comprising authenticating the single-session anonymous-user credentials on the target resource.

13. The method of claim 1, comprising authenticating the single-session anonymous-user credentials on the client system.

14. An information handling system comprising a computer processor, wherein the computer processor is operable to implement a method, the method comprising:
creating an anonymous target that generically represents anonymous users;
assigning shared resources to the anonymous target;
receiving a request for anonymous access from a client system of an anonymous user, wherein the request for anonymous access excludes credentials;
responsive to the request for anonymous access:
generating, by the information handling system, single-session anonymous-user credentials for the anonymous user, wherein the single-session anonymous-user credentials are not presented to or provided by the anonymous user;
determining the shared resources assigned to the anonymous target;
communicating at least a portion of the determined shared resources to the client system as authorized anonymous-access resources;
responsive to the communicating, receiving a request from the client system to access a target resource of the authorized anonymous-access resources;
causing an anonymous-user account to be created on the target resource using the single-session anonymous-user credentials; and
allowing the client system anonymous single sign-on access to the target resource via the anonymous-user account and without the client system providing credentials to the information handling system.

15. The information handling system of claim 14, wherein the assigning comprises assigning virtual desktops and related resources to the anonymous target.

16. The information handling system of claim 15, wherein:
the related resources comprise at least one application; and
the at least one application authenticates the anonymous user in a non-anonymous fashion as the anonymous user accesses the at least one application.

17. The information handling system of claim 14, wherein the causing comprises sending a message to the target resource, the message comprising an instruction to add the anonymous-user account to a resource group for the target resource.

18. The information handling system of claim 14, comprising, upon logout by the anonymous user from the target resource, destroying the anonymous-user account.

19. The information handling system of claim 18, wherein the destroying comprises:
removing the anonymous-user account from a resource group for the target resource;
deleting a user profile associated with the anonymous-user account; and
deleting any user data created within the anonymous user's session.

20. A computer-program product comprising a non-transitory computer-usable medium having computer-readable program code embodied therein, the computer-readable program code adapted to be executed to implement a method comprising:
creating an anonymous target that generically represents anonymous users;
assigning at least a portion of the shared resources to the anonymous target;
receiving a request for anonymous access from a client system of an anonymous user, wherein the request for anonymous access excludes credentials;
responsive to the request for anonymous access:
generating, by a broker server that provides single sign-on (SSO) access to shared resources, single-session anonymous-user credentials for the anonymous user, wherein the single-session anonymous-user credentials are not presented to or provided by the anonymous user;
determining the shared resources assigned to the anonymous target;
communicating at least a portion of the determined shared resources to the client system as authorized anonymous-access resources;
responsive to the communicating, receiving a request from the client system to access a target resource of the authorized anonymous-access resources;

responsive to the request to access the target resource, causing an anonymous-user account to be created on the target resource using the single-session anonymous-user credentials; and allowing the client system anonymous SSO access to the target resource via the anonymous-user account and without the client system providing credentials to the broker server.

\* \* \* \* \*